M. C. SCHWEINERT & H. P. KRAFT.
VALVE.
APPLICATION FILED FEB. 10, 1909.

1,045,330.

Patented Nov. 26, 1912.

WITNESSES:
Fred White
Rene Bruine

INVENTORS:
Maximilian Charles Schweinert
and Henry P. Kraft,
By Attorneys.
Arthur E. Fraser & Usina

UNITED STATES PATENT OFFICE.

MAXIMILIAN CHARLES SCHWEINERT, OF WEST HOBOKEN, NEW JERSEY, AND HENRY P. KRAFT, OF NEW YORK, N. Y.

VALVE.

1,045,330.

Specification of Letters Patent. Patented Nov. 26, 1912.

Application filed February 10, 1909. Serial No. 477,129.

*To all whom it may concern:*

Be it known that we, MAXIMILIAN CHARLES SCHWEINERT, residing in West Hoboken, in the county of Hudson and State of New Jersey, and HENRY P. KRAFT, residing in the borough of Brooklyn, in the county of Kings, city and State of New York, citizens of the United States, have invented certain new and useful Improvements in Valves, of which the following is a specification.

This invention aims to provide certain improvements in valves adapted for various uses, and especially for use in connection with vehicle tires.

The valve is of the character designed to permit the actuation, by the pressure within the tire, of pressure indicating or other means.

The accompanying drawings illustrate an embodiment of the invention.

Figure 1:
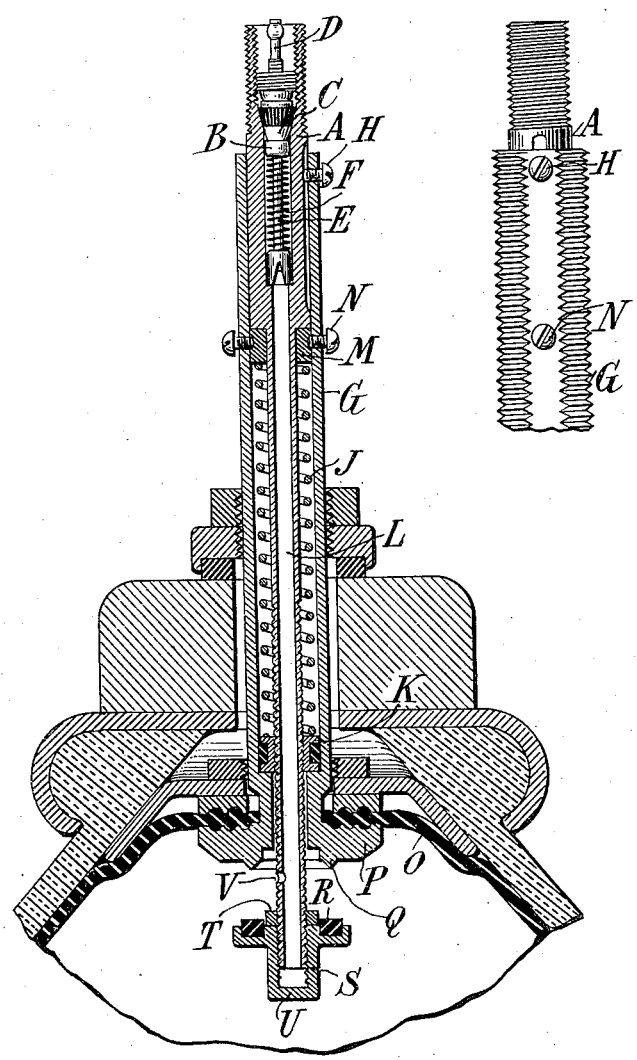
Figure 3:
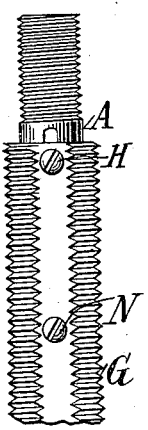
Figure 2:
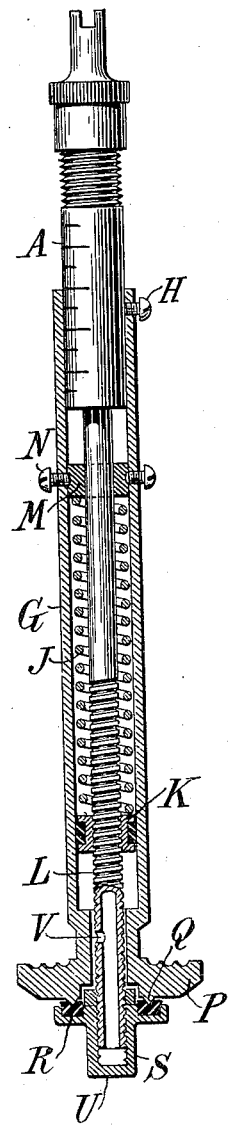

Figure 1 is a longitudinal section of a valve mounted on a tire in the position which it assumes while air is being pumped through it; Fig. 2 is a similar view in the position assumed after the tire is inflated; Fig. 3 is a side elevation of the upper part of the valve corresponding to the position of Fig. 1.

The valve through which air is introduced may be of any known or suitable design. In the embodiment of the invention illustrated, the valve comprises a shell A, and a valve body B which seats against a hollow seat C and has stems D and E projecting above and below it, and a spring F holding it up to its seat. The shell A and parts therein are arranged to slide in an outer tube or casing G with a good sliding fit, being held from turning by a screw H entering a longitudinal groove in the shell A. Normally the shell is held down by means of a spring J consisting of a compressed coil the lower end of which engages a packed ring K screwed on the lower end of a tube L which forms an extension of the shell A of the valve; the upper end of the spring reacting against a ring M which is held in position in the outer tube by means of one or more screws N.

When the pressure within the tire O becomes sufficiently great, it will force up the valve and with it the tube L and collar K against the resistance of the spring J. The valve shell A will therefore project upward out of the outer tube G in the manner shown in Fig. 2. The amount of compression of the spring will depend on the pressure within the tire, and will be represented by the distance which the valve shell A projects above the outer tube G. The position of the valve will thus indicate the pressure within the tire, and a scale may be marked on the shell A as indicated in Fig. 2 to indicate exactly the pressure represented by different positions of the latter.

In order to prevent the escape of air between the outer tube G and the valve shell A, when introducing the compressed air, any suitable packing may be provided between the collar K and the tube G as shown, or at any other suitable point. Preferably a packing is provided within the tire which cuts off absolutely any communication between the space within the tire and the space outside of the same when the valve yields to an outward pressure, this cut-off device being adjustable so that it may be arranged to cut off the escape of air at any desired pressure. This cut off device acts in connection with a head P of the outer tube G, which head lies within the tire, the latter being clamped between said head and the usual clamping devices on the outside of the tire. The closure consists of an annular valve seat Q on the member P, and an annular packing ring R carried in a groove in a device S, and adjustable relatively to the valve by screwing said device up or down on the tube L; a set-nut T serving to hold the device S in its position of adjustment. The device S has a long tubular central portion threaded on the tube L, and has a bottom U so that there can be no escape of air through the member S and by way of the screwthreads to the space between the tube L and the outer tube G. Therefore when the pressure in the tube corresponds to that for which the closing device is set, the parts will assume the position of Fig. 2, and the seat Q and packing ring R will cut off all communication from the space within the tire to the outside space. In pumping air into the tire, the air is admitted through an opening V above the set-nut T, the parts assuming the position of Fig. 1 under the influence of the air pressure from the pump.

What we claim is:—

1. An inflation valve for tires, having an inner tubular portion adapted to extend into the tire, an outer tubular portion through which said inner portion passes, an inwardly opening valve in said inner portion through which the tire is inflated, a spring for pressing said inner portion into the tire and yielding to the pressure within the tire, and means within the tire for entirely cutting off the space therein from the outside air.

2. In combination, an admission valve having a tubular portion L adapted to extend within a tire, an outer tube G clamped upon the tire, a packing between said tubular portion and said outer tube, a valve in said tubular portion L through which the tire is inflated, said tube L being movable outwardly in the tube G by air pressure within the tire, and a device surrounding and extending across the inner end of said tube L and closing against a part of said outer tube G when the tube L is forced outward by the air pressure.

3. In combination, an admission valve having a tube L, an outer tube G having a head P, a packing between said tubular portion and said outer tube, a valve in said tube L to which the tire is inflated, said tube L being movable outwardly in the tube G by air pressure within the tire, and a closing device S forming a tight closure against a part of said head P when said tube L is forced outward by air pressure and surrounding and extending over the inner end of said tube L.

4. In combination, an admission valve having a tube L, an outer tube G having a head P, a valve in said tube L through which the tire is inflated, said tube L being movable outwardly in the tube G by air pressure within the tire, and a device S adapted to close against a part of said head P when said tube L is forced outward by air pressure, said device S being adjustable on the tube L and surrounding and extending over the inner end of said tube L.

In witness whereof, we have hereunto signed our names in the presence of two subscribing witnesses.

MAXIMILIAN CHARLES SCHWEINERT.
HENRY P KRAFT.

Witnesses:
   DOMINGO A. USINA,
   FRED WHITE.